United States Patent

[11] 3,582,547

| [72] | Inventors | James A. Horton<br>Munroe Falls;<br>James E. Mount, Stow; Roderic H.<br>O'Connor, Akron, all of, Ohio |
|---|---|---|
| [21] | Appl. No. | 769,279 |
| [22] | Filed | Oct. 21, 1968 |
| [45] | Patented | June 1, 1971 |
| [73] | Assignee | Goodyear Aerospace Corporation<br>Akron, Ohio |

[54] MULTIPLE-CHANNEL VERGENT CONJUGATES IMAGERY GENERATOR SYSTEM
5 Claims, 5 Drawing Figs.

[52] U.S. Cl. .................................................. 178/7.92,
    178/7.88
[51] Int. Cl. .................................................. H04n 5/24,
    H04n 5/26
[50] Field of Search ................................. 178/61 ND,
    7.88, 7.92; 350/21, 313, 293, 189, 186

[56] References Cited
UNITED STATES PATENTS

| 3,113,484 | 12/1963 | Baker | 350/213 |
| 2,402,405 | 6/1946 | Hurley, Jr. | 350/293 |
| 3,041,393 | 6/1962 | Henning | 178/61ND |
| 2,267,813 | 12/1941 | Buckner | 178/7.88 |

FOREIGN PATENTS

| 1,016,033 | 9/1957 | Germany | 350/21 |

Primary Examiner—Robert L. Griffin
Assistant Examiner—Barry L. Leibowitz
Attorney—J. G. Pere ABSTRACT: The invention provides an optical pickup whose entrance pupil is externally located and whose image is rectilinearly generated. A plurality of optical systems with each providing a moderately large field of view, together with low distortion and an external entrance pupil are physically integrated so that the entrance pupils of all systems occupy a common spatial location, representing the real world location of an observer's eyes. Each channel shares a physically common first element consisting of a fixed multifaceted mirror or prism. This element serves to fold the components of the remainder of the optical channels through some angular relationship such that these components are then closely grouped in side-by-side fashion about a reference axis oriented at some predetermined angle (nominally 90°) to those of the several incident optical axes in object space. An infinite-depth-of-field feature may be utilized, operating on an independent per channel basis. The imagery generated by the individual channels can then be recombined and presented as a display for simulator purposes to represent for example the real world visual environment as seen by the pilot of an aircraft or other vehicle.

INVENTORS
JAMES A. HORTON
JAMES E. MOUNT
RODERIC H. O'CONNOR
BY:
Oldham & Oldham
ATTORNEYS

MULTIPLE-CHANNEL VERGENT CONJUGATES IMAGERY GENERATOR SYSTEM

One parameter currently slowing advance in the state of the art of simulation optical pickups is field of view. The requirements of external entrance pupil and low distortion (usually 5 percent or less over the entire field) have limited the field of view of pickup devices to less than 120°. In an effort to enlarge the field of view capability of optical pickups without degrading their performance, the invention proposes a multichannel system. In such a system the fields of view of two or more conventional optical pickups are mosaicked together so that the composite horizontal field is enlarged over that of a single channel by a factor approximately equal to the number of individual channels. In order to provide proper perspective and picture continuity, the individual optical channels must be aligned so that their entrance pupils are coincident and their horizontal field angles adjacent and continuous. For mechanical considerations the entire system is folded by a multifaceted mirror or prism.

The general object of the invention is to permit the viewing by an optical pickup device and subsequent relaying by television of an ultrawide angular (greater than 120°) field of view of a terrain model or other object with the view of the object displaying high resolution, a minimum of distortion, and an effectively infinite depth of field over an object surface of interest. The resultant composite scene can be presented to an observer by any type of display such as a virtual image display. The ultimate display scheme does not comprise a part of the invention.

The aforesaid object of the invention and other objects which will become apparent as the description proceeds are achieved by providing a multichannel optical pickup to provide an unlimited field of view which comprises a plurality of channels each comprising an imaging lens, a focusing lens, and an objective lens, each channel defining also an optical axis with the several axes diverging through their respective objective lenses out of a common entrance pupil location, and where each channel lies at a common angle with respect to a reference plane through the entrance pupil, and a multifaceted reflector positioned properly so that the optical information detected by each channel is received on one face of the reflector.

For better understanding of the invention reference should be had to the accompanying drawings wherein.

Figure 1:
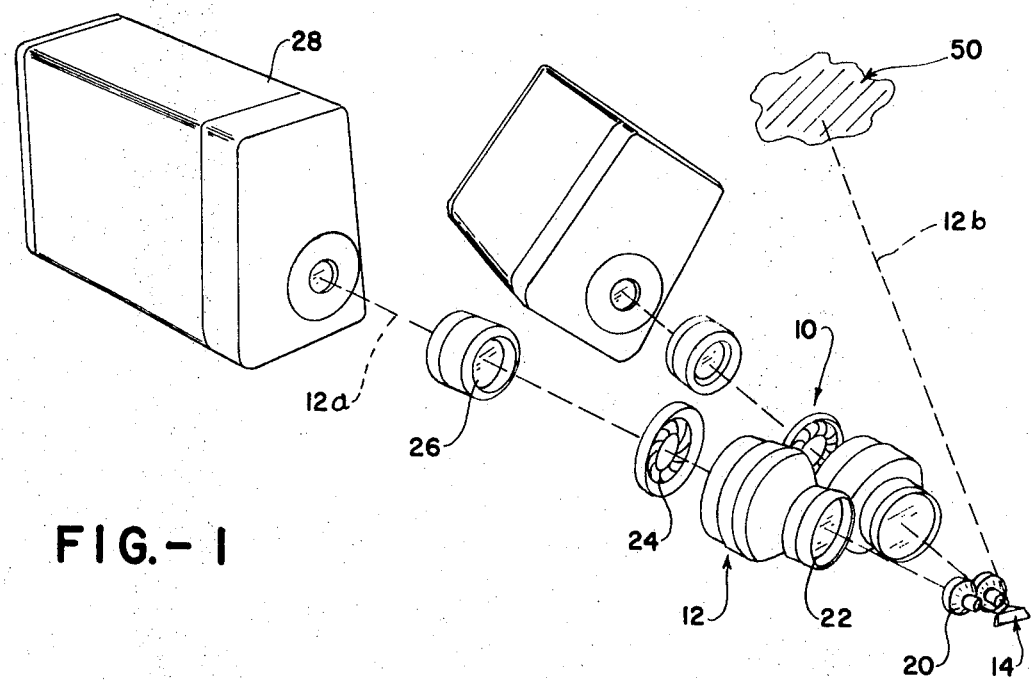
FIG. 1 is a perspective view of the multiple-channel pickup system comprising a preferred embodiment of the invention.

With reference to the form of the invention illustrated in FIG. 1 of the drawings, the concept is based on the attainment of an optical pickup whose entrance pupil is externally located and whose image is rectilinearly generated and possesses effectively infinite depth of field. A single refractive optical system cannot operate rectilinearly and still provide an ultrawide field and an external entrance pupil. To overcome the difficulty, the present concept utilizes multiple optical systems, each providing a moderately large field of view, together with low distortion and an external entrance pupil, which are physically integrated so that the entrance pupils of all the systems occupy a common spatial location, representing the real world location of an observer's eyes.

Figure 5:
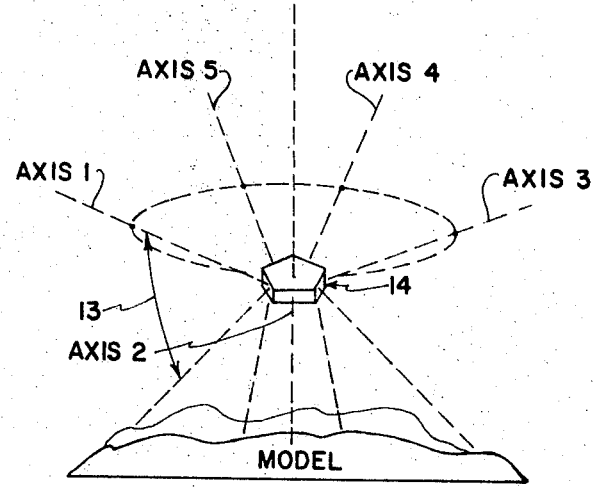
FIG. 5 is a schematic perspective view of the arrangement of the optical axis with respect to the common mirror or prism.

The present concept utilizes five optical channels each covering a total field of 84.5° and providing TV formats of standard (4:3) aspect ratio with horizontal and vertical fields of 72 and 57°, respectively. The total field generated is thus 360° by 57°. The preferred structural embodiment of the five-channel setup is shown schematically in FIG. 5 of the drawings. Essentially the channels are shown as lying on axes 1 through 5 with relation to the common five-faced mirror or prism 14. In the preferred embodiment the axes 1 through 5 lie in a conical relation in image space with respect to the prism 14 about a common reference axis 15, with the angle between incidence and reflection at the prism 14 being about 45°, as shown by angle 13 with respect to axis 1, in FIG. 5. The reference axis 15 is nominally perpendicular to the model elevation datum. The angle 13 could vary between about 15° and about 75° and still meet the basic objects of the invention. The reason for having the optical channels positioned above the prism 14, and within the angular ranges indicated above is so the entire optical pickup system including prism 14 can be tilted about the common entrance pupil with respect to the elevation datum of the model at low simulated altitudes without the physical structure of the optical system coming into contact with the model. This tilting provides an extremely realistic simulation for the pitch and roll altitudes of aircraft with respect to the model. The magnitude of the angle 13 is directly proportional to the amount of tilting that can be accomplished at low simulated altitudes.

The five channels, only two of which are exemplified in FIG. 1 and designated generally by numerals 10 and 12, have a common first element consisting of a fixed multifaceted mirror or prism, indicated generally by numeral 14. The mirror or prism 14 serves to fold the components of the remainder of the optical channels through a predetermined angle relative to mirror or prism 14 such that these components are then closely grouped in side-by-side fashion around the reference axis 15 of FIG. 5. Angular vehicle motion is then simulated by corresponding angular motions of the entire device about the common entrance pupil.

Each of the channels 10 and 12 comprise the same elements, and hence only the elements of channel 12 will be described hereinafter in detail. Specifically, a short focal length objective lens 20 is positioned to record the image through the mirror or prism 14. This passes into a focusing lens 22, an iris diaphragm 24, and an imaging lens 26 before being picked up by a suitable television camera tube 28. The optical axis of channel 12 is indicated by a dotted line 12 a, and it can be seen that the various lens components all lie on this line. The object axis is indicated by dotted line 12 b and it projects onto the target 50. Any appropriate structural system to hold the lenses in alignment can be utilized. However, the frame should allow some adjustability of the component so as to achieve proper alignment, and provide for different lens combinations, as the need may arise.

Also, in order to provide an infinite depth of field feature, the imaging lens 26 may be made tiltable in any plane by a mounting on an independent per channel basis. This independence is necessary because any instantaneous attitude and altitude being simulated by the pickup system is really a plurality of different attitudes and altitudes, or in effect different for each optical channel. For better understanding of this depth of field feature, reference should be made to copending patent application Ser. No. 772,960 entitled A Simulator Having Infinite Depth of Field Optical Pickup filed Nov. 4, 1968, and also assigned to the same assignee as this application.

PICKUP HEAD ASSEMBLY

The multifaceted mirror or prism 14 is mounted so as to provide a proper angular relationship with respect to a model indicated generally by numeral 50 to achieve a sufficiently wide field of view to meet the objects of the invention. Essentially, in the embodiment shown in FIG. 2 of the drawings, the mirror or prism 14 illustrates one of the mirror faces 14a mounted to provide a 45° angle between the incident optical axis from the model 50 and the optical axis through the front objective lens 20. The face 14 a is tilted at a 67½° angle with relation to the simulated horizontal. Hence, it should be seen that the model 50 is actually positioned below the lens or prism 14, rather than above as shown in the structural schematic of FIG. 1 of the drawings. However, the model 50 could actually be positioned above the lens or prism 14 and still achieve the objects of the invention. Either the model or the system can be moved relative to each other to achieve the simulator features necessary to achieve the objects of the invention. The movement however, does not comprise a part of the invention, as any conventional way to achieve movement will suffice.

Figure 3:
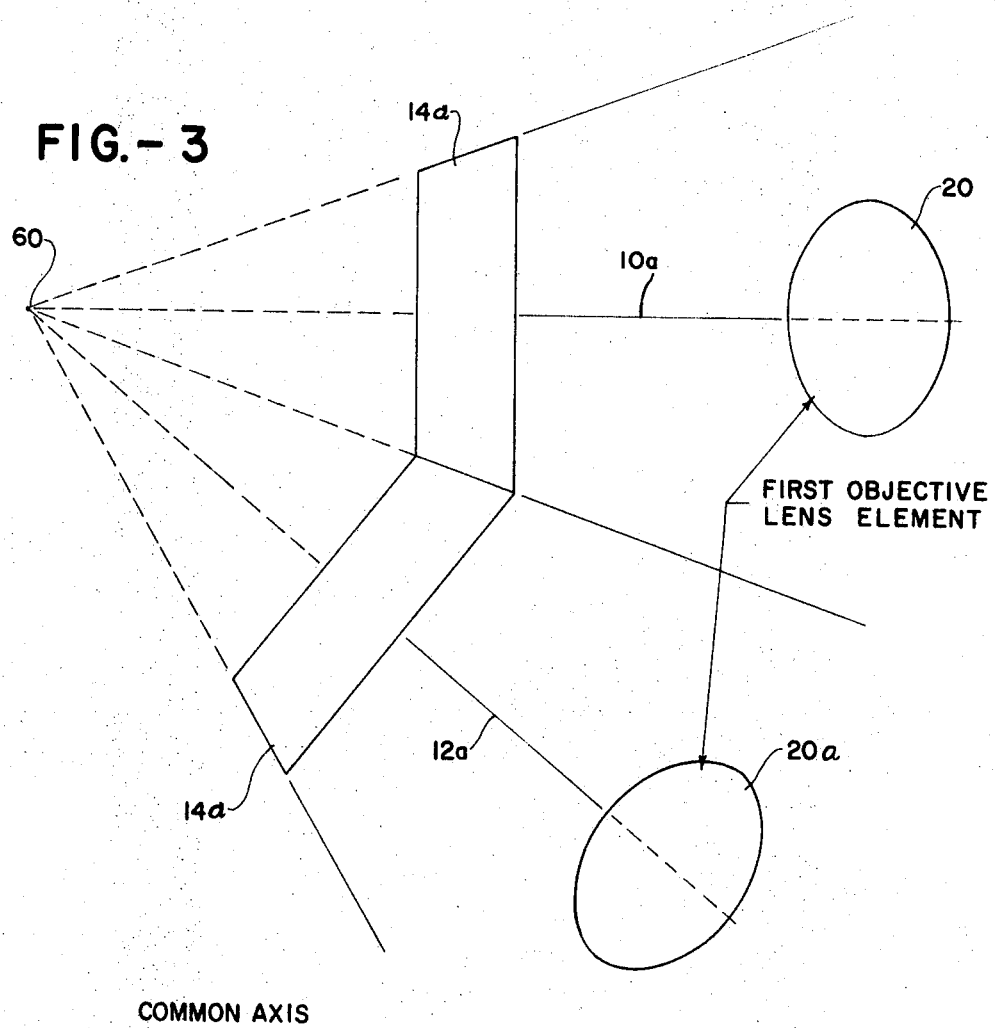
FIG. 3 is a plan view of two adjacent channels showing their relationship to the objective lenses and the optical axes for the multichannel system.

FIG. 3 illustrates a plan view of the mirror or prism 14 showing the two channels illustrated in FIG. 1. This view shows that the folded axes of each channel designated 10 and 12 actually diverge from an entrance pupil 60 which is located externally to the objective lenses. The folded axes 10a and 12a lie nominally at the angle 13 relative to the model elevation datum and their unfolded object-space counterparts which in this illustration occupy the same loci. Each of the mirror faces 14 a is appropriately aligned with its respective axis so as to project light up into the objective lens of that channel.

Figure 2:
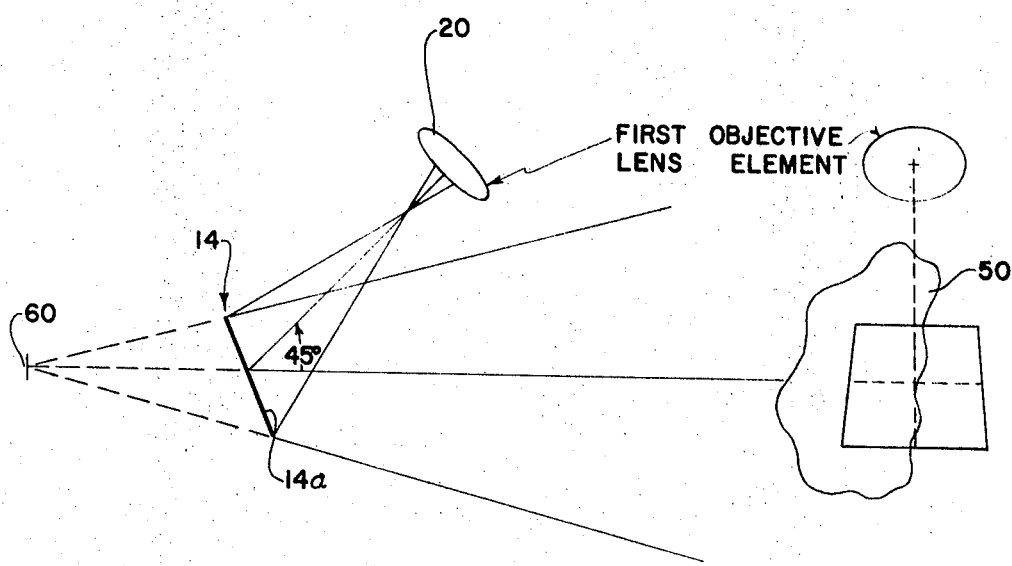
FIG. 2 is a side elevational view of one path-folding element in combination with the first objective lens element of one optical channel showing how image information is picked up.

Another important aspect of the invention, however, is illustrated in FIG. 3, and this is that the mirror faces actually are trapezoidal in shape, having a larger dimension on the bottom than on the top. In the embodiment illustrated, with the objective lens 20 having a diameter of 0.332 inches, the bottom edge of the mirror face 14 a is approximately 0.491 inches, while the top face is approximately 0.393 inches. Naturally, even though only two channels are illustrated in FIGS. 1—3, it should be understood that five channels, each covering a total diagonal field of 84.5° would create a total field of 360 ° with each of the five channels having a first element consisting of the appropriate mirror or prism.

SYSTEM COMBINATION FOR SIMULATION

Figure 4:
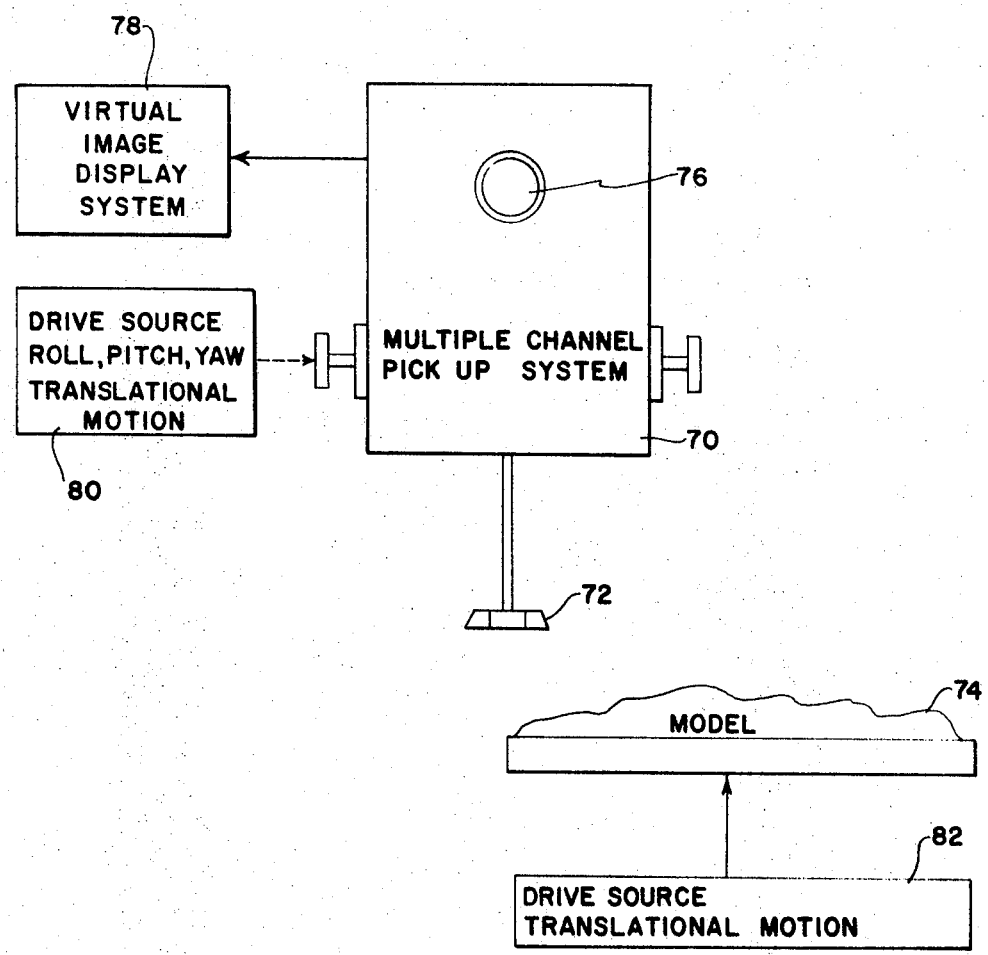
FIG. 4 is a schematic diagram showing how the multichannel optical system can be utilized to provide a virtual image display.

FIG. 4 illustrates a block diagram of the total system combination which in essence shows the multichannel pickup system as block 70, a multifaceted mirror prism 72, a model 74, a depth of field adjustment 76, and with the output of the system 70 being sent to any suitable display system such as a virtual image display system. The actual operation of the display system 78 is set forth in patent application Ser. No. 731,234, filed May 22, 1968, entitled Simulator Having Visually Independent Image Display. Movement is provided to the pickup system 70 by power means 80. Additional movement may be provided to the model 74 by a power means 82.

This basic system includes the use of the multichannel optical pickup system, the mechanical assembly used to angularly position the pickup about the resultant common entrance pupil and in translation, the television systems with appropriate television cameras 28, and a virtual image display system. The television systems may consist of five independent, high resolution TV systems, each of which tranduces its assigned 4:3 aspect ratio scene (corresponding to a single optical channel) and passes the resultant video to a corresponding single TV monitor or projection cathode ray tube for use in the display system.

One of the other aims of this concept is to achieve a modular design such that a given system may employ either two, three, four, or five channels, corresponding to horizontal fields of 144°, 216°, 288°, or 360°, each with a 57° vertical field. It should be obvious, however, that some other basic optical field size may be used on individual channels. Also, each such optical field may be used in formats having aspect ratios other than 4:3. A completely modular design is achieved by separation of the individual facets of the path folder 14.

The multifaceted mirror or prism will have each surface adjacent to the other with sharp delineation between surfaces, no spacing other than the very narrow line of demarcation between the angular relationship of the mirrors or prisms. Picture continuity across the composite field is very good which indicates that the mosaicked fields from each channel can be made continuous. A slight amount of field overlap has been found desireable in order to avoid serious vignetting at adjoining edges of the mirror or prisms. However, it has also been found that the amount of overlap can be decreased by increasing the $f$ number of the lenses in each channel.

What we claim is:

1. A multichannel optical pickup system to provide an unlimited field of view which comprises a plurality of channels each comprising an optical pickup,
    an imaging lens for each pickup,
    a focusing lens for each imaging lens and
    an objective lens for each focusing lens which is characterized by each channel defining an optical axis with the axes diverging through their respective objective lenses from a coincident entrance pupil, and where each channel lies at a common angle with respect to a reference plane through the entrance pupil, and a multifaceted reflective means positioned in fixed relation to the channels and entrance pupil so that the optical information detected by each channel is reflected from one face of said means to a respective channel consisting of the above lenses.

2. A system according to claim 1 which includes at least two channels, and where the reflective angle between the reflective means and each channel is between 30° to 60°.

3. A system according to claim 2 which includes frame means to hold the structure comprising the channels in proper position with respect to the reflective means, whereby when the reflective means views a substantially horizontal simulated angle, the frame means extends substantially vertically above the reflective means.

4. A system according to claim 3 which includes five channels each having an optical viewing area of 72° wide and 57° high, and where there are five faces of the reflective means which are at an angle of 67½° with relation to the horizontal.

5. A system according to claim 4 where the faces of the reflective means are trapezoidal in shape with the lower edge longer than the upper edge.